(12) United States Patent
Yang et al.

(10) Patent No.: US 11,480,644 B2
(45) Date of Patent: Oct. 25, 2022

(54) APPARATUS AND METHOD FOR DETERMINING PROXIMITY IN SMART CAR SYSTEM

(71) Applicant: Samsung Electronics Co., Ltd., Suwon-si (KR)

(72) Inventors: Ho Yang, Suwon-si (KR); Sungmin Jo, Suwon-si (KR); Kwanghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 560 days.

(21) Appl. No.: 16/498,088

(22) PCT Filed: Mar. 21, 2018

(86) PCT No.: PCT/KR2018/003213
§ 371 (c)(1),
(2) Date: Sep. 26, 2019

(87) PCT Pub. No.: WO2018/186608
PCT Pub. Date: Oct. 11, 2018

(65) Prior Publication Data
US 2021/0116532 A1     Apr. 22, 2021

(30) Foreign Application Priority Data

Apr. 4, 2017  (KR) .................. 10-2017-0043721

(51) Int. Cl.
*H04W 4/44*     (2018.01)
*G01S 5/02*     (2010.01)
(Continued)

(52) U.S. Cl.
CPC ............ *G01S 5/021* (2013.01); *G01S 5/0249* (2020.05); *G01S 5/0295* (2020.05); *G06N 20/00* (2019.01);
(Continued)

(58) Field of Classification Search
CPC ...... G01S 5/021; G01S 5/0249; G01S 5/0295; G01S 19/46; G06N 20/00; H04W 4/44;
(Continued)

(56) References Cited

U.S. PATENT DOCUMENTS

2006/0052933 A1* 3/2006 Ota .................. G08G 1/161
701/532
2012/0040665 A1* 2/2012 Liu .................. H04M 1/72463
455/426.1
(Continued)

FOREIGN PATENT DOCUMENTS

KR   10-2012-0115644 A   10/2012
KR   10-2013-0033731 A    4/2013
(Continued)

OTHER PUBLICATIONS

Korean Notice of Patent Grant dated Jun. 18, 2021, issued in Korean Patent Application No. 10-2017-0043721.
(Continued)

*Primary Examiner* — Shaima Q Aminzay
(74) *Attorney, Agent, or Firm* — Jefferson IP Law, LLP

(57) ABSTRACT

The present disclosure relates to determining proximity in a smart car system, and a method for operating a vehicle system comprises the steps of: receiving at least one signal transmitted by a user apparatus; transmitting measurement data for the at least one signal to a management apparatus; and receiving updated mapping data from the management apparatus for the measurement data and proximity data.

9 Claims, 10 Drawing Sheets

(51) Int. Cl.
  *G06N 20/00* (2019.01)
  *B60R 25/24* (2013.01)
  *B60R 25/31* (2013.01)
  *B60R 25/33* (2013.01)
  *G01S 19/46* (2010.01)

(52) U.S. Cl.
  CPC ............. *H04W 4/44* (2018.02); *B60R 25/245* (2013.01); *B60R 25/31* (2013.01); *B60R 25/33* (2013.01); *G01S 19/46* (2013.01)

(58) Field of Classification Search
  CPC ....... H04W 4/023; H04W 8/00; H04W 64/00; H04W 64/006; H04W 8/005; B60R 25/245; B60R 25/31; B60R 25/33; H04L 29/08; H04L 67/12
  USPC ........................................................ 455/457
  See application file for complete search history.

(56) References Cited

U.S. PATENT DOCUMENTS

2013/0162421 A1  6/2013  Inaguma et al.
2015/0242760 A1  8/2015  Miao et al.

FOREIGN PATENT DOCUMENTS

KR    10-2016-0013334 A    2/2016
KR    10-2016-0019758 A    2/2016

OTHER PUBLICATIONS

Korean Office Action dated Dec. 14, 2020, issued in Korean Application No. 10-2017-0043721.

\* cited by examiner

APPARATUS AND METHOD FOR DETERMINING PROXIMITY IN SMART CAR SYSTEM

TECHNICAL FIELD

The disclosure generally relates to a smart car system and, more particularly, to a method and apparatus for determining proximity in a smart car system.

BACKGROUND ART

As network and sensing technologies have been developed, electronic and communication technologies have come to be applied in various fields. Accordingly, if communication/sensing technologies are applied to products which have not used communication technologies, user convenience may increase. For example, there is a smart car system, that is, a connected car system.

The smart car system indicates a vehicle system, which contains a network accessible device in a vehicle and implements a physical system in which the inside of the vehicle and an external network are mutually connected via wireless communication, and indicates a related communication environment. Via the smart car system, a new user experience (UX) different from usual may be provided to a driver.

DISCLOSURE OF INVENTION

Technical Problem

As described above, the disclosure provides a method and apparatus for efficiently determining the proximity of a driver in a smart car system.

Also, the disclosure provides a method and apparatus for managing mapping information for determining proximity in a smart car system.

Also, the disclosure provides a method and apparatus for detecting an error in determination of proximity in a smart car system.

Also, the disclosure provides a method and apparatus for updating mapping information in response to an error in determination of proximity in a smart car system.

Solution to Problem

In accordance with an aspect of the disclosure, an operation method of a vehicle device in a smart car system may include: receiving at least one signal transmitted from a user device; transmitting measurement data associated with the at least one signal to a management device; and receiving updated mapping information associated with measurement data and proximity information from the management device.

In accordance with another aspect of the disclosure, an operation method of a management device in a smart car system may include: receiving, from a vehicle device, measurement data associated with at least one signal transmitted from a user device; updating, based on the measurement data, mapping information associated with measurement data and proximity information; and transmitting the updated mapping information to the vehicle device.

In accordance with another aspect of the disclosure, an operation method of a user device in a smart car system may include: receiving, from a management device, a first proximity determination result generated by a vehicle device; displaying the first proximity determination result; and transmitting, to the management device, an error report associated with determination of proximity made by the vehicle device, based on a second proximity determination by a user.

In accordance with another aspect of the disclosure, a vehicle device in a smart car system may include: a controller configured to measure at least one signal transmitted from a user device; a transmitter configured to transmit measurement data associated with the at least one signal to a management device; and a receiver configured to receive updated mapping information associated with measurement data and proximity information from the management device.

In accordance with another aspect of the disclosure, a management device in a smart car system may include: a receiver configured to receive, from a vehicle device, measurement data associated with at least one signal transmitted from a user device; a controller configured to update mapping information associated with measurement data and proximity information, based on the measurement data; and a transmitter configured to transmit the updated mapping information to the vehicle device.

In accordance with another aspect of the disclosure, a user device in a smart car system may include: a receiver configured to receive, from a management device, a first proximity determination result generated by a vehicle device; a display unit for displaying the first proximity determination result; and a transmitter configured to transmit, to the management device, an error report associated with determination of proximity made by the vehicle device based on a second proximity determination by a user.

Advantageous Effects of Invention

A method and apparatus according to various embodiments of the disclosure may update mapping information corresponding to measurement data as an error in determination of proximity is detected, thereby accurately determining proximity of a driver.

Effects which can be acquired by the disclosure are not limited to the above described effects, and other effects that have not been mentioned may be clearly understood by those skilled in the art from the following description.

BEST MODE FOR CARRYING OUT THE INVENTION

Figure 1:
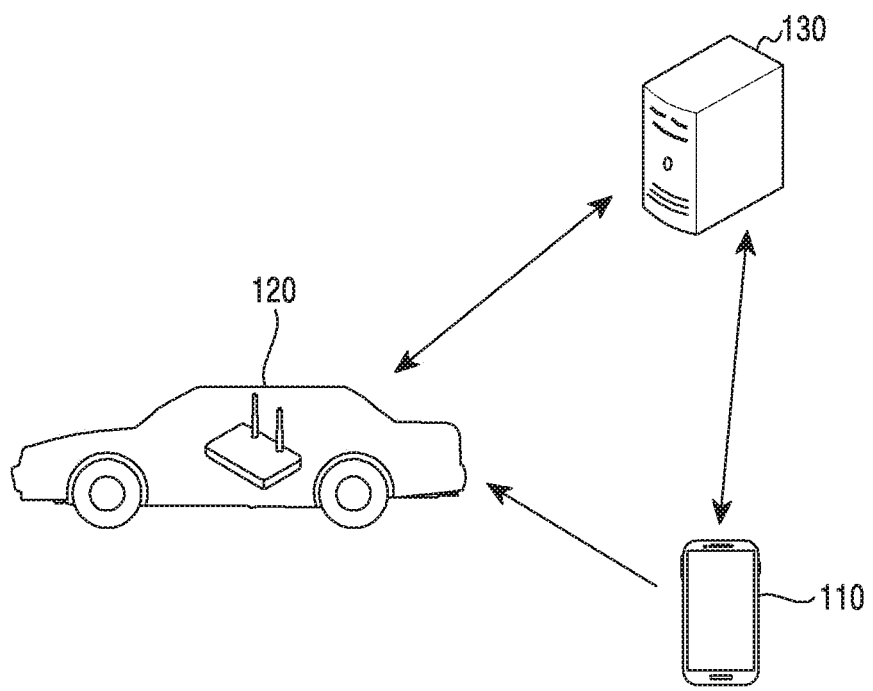
FIG. 1 is a diagram illustrating a communication environment related to a smart car system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to a method and apparatus for determining proximity in a smart car. Particularly, the disclosure describes a technology for detecting an error in determination of proximity and performing optimization based on detection of an error in a smart car system. Here, the smart car system refers to "connected car system" or another name having the technical meaning equivalent thereto.

The term referring to channel information used in the following description, the term referring to network entities, and the term referring to an element of the device are employed for convenience of description. Accordingly, the disclosure is not limited to the following terms and other terms having the same technical meaning may be used.

The smart car system is capable of controlling a vehicle based on whether a driver is near. For example, a driver carrying a smart key is within a predetermined range from a vehicle, the smart car system unlocks the door of the vehicle. Conversely, if a driver is at least a predetermined range distant from the vehicle, the smart car system may lock the door of the vehicle. In this instance, the driver may expect a smart key proximity performance which is optimized for the driver, that is, the accuracy of determination of proximity. However, generally, a proximity determination model is designed based on statistical data of a radio frequency (RF) signal collected from a normal smart key. Accordingly, if a driver has a smart key based on short-range communication (e.g., Bluetooth) in which an RF signal varies dynamically, there is a limitation in determining proximity.

For example, the usage pattern of a smart key may be different depending on the gender or age of a user. Particularly, the place whether to keep a smart key may be different. If the place is outside the vehicle, the place may be a bag, a front pocket, a back pocket, or the like. If the place is inside the vehicle, the place may be the front passenger seat, a cradle, a vehicle's door, or the like. Also, if the smart key is implemented in a smart phone, a call scheme may be different, such as a direct call, a call by holding a smart phone with a hand and using an ear set, a call using a Bluetooth (BT) ear set, and the like.

Therefore, learning data needs to be collected in order to perform intellectual processing via a machine learning scheme for personalization, which has difficulty as follows. First, separate equipment is required in order to collect learning data. A separate device for measuring and storing the location of a driver relative to a vehicle may cause an increase in cost. Since collecting location measurement data is difficult, it is not practical to request an ordinary person to collect the location measurement data. Second, if a driver needs to visit a manufacturer in order to solve a problem, that is, if the driver needs to visit a local agency in order to solve the technical problem associated with proximity, it is inconvenient for the driver.

Therefore, there is a desire for a data collecting and machine learning scheme which reflects personal characteristics, as shown in various embodiments described below.

FIG. 1 is a diagram illustrating a communication environment related to a smart car system according to various embodiments of the disclosure.

Referring to FIG. 1, a communication environment may include a user device 110, a vehicle device 120, and a management device 130.

The user device 110 may be a device carried by a user, that is, a driver. The user device 110 may have portability and mobility. The user device 110 may transmit signals which may be used when the vehicle device 120 performs measurement, and may communicate with a management device 130. For example, the user device 110 may be a device in which an application is installed for a smart car system, or may be a dedicated device for a smart car system. The user device 110 may be referred to as a "terminal", "electronic device", "smart phone", "smart key", or other names having the technical meaning equivalent thereto.

The vehicle device 120 is a device installed inside or outside a vehicle in order to implement a smart car system. The vehicle device 120 may sense or receive a signal from the user device 110 via at least one antenna installed in the vehicle, and may measure the signal. Also, the vehicle device 120 may communicate with the management device 130. For example, the vehicle device 120 may upload measurement data to the management device 130, and may download mapping information and related firmware from the management device 130. According to an embodiment, the vehicle device 120 may determine proximity, based on measurement or sensing data, and may detect an error in the determination, based on information other than the measurement or sensing data (e.g., a device operation which is contradictory to the determination). The vehicle device 120 may be referred to as a "vehicle-dedicated device", "proximity measurement device", "location measurement device", "vehicle door control device", "smart key block", or other names having a technical meaning equivalent thereto.

The management device 130 manages information for operating a smart car system. For example, the management device 130 may monitor a proximity determination result obtained by the vehicle device 120, and may manage mapping information and related firmware for determining proximity Here, the mapping information indicates processed data that defines a correspondence relationship between measurement data and proximity information. For example, mapping information may include at least one of a model variation or a variation value required for determining proximity (e.g., inside, near, far, or the like) corresponding to measurement data. The mapping information may be referred to as a "proximity model", "proximity table", "machine learning model", "artificial intelligence model", "statistical classification model", "maximum likelihood (ML) model", or other names having a technical meaning equivalent thereto. Also, the management device 130 may be referred to as a "computing block", "control server", "mapping management server/device", or other names having technical meanings equivalent thereto.

According to an embodiment, the management device 130 may be implemented as a separate device which is physically separated from the vehicle device 120. For example, the management device 130 may be implemented as a normal server operated by a manufacturer, or a cloud server. According to other embodiments, the management device 130 may be implemented inside a vehicle together with the vehicle device 120, or may be implemented to be the physically same equipment as the vehicle device 120. For ease of description, the management device 130 is a device separate from the vehicle device 120, and the description thereof is provided under the assumption that the management device 130 is implemented outside the vehicle. However, various embodiments provided below may be equivalently applied to the case in which the management device 130 is implemented inside the vehicle together with the vehicle device 120 or the case in which the management device 130 is implemented to be the physically same equipment as the vehicle device 120.

According to an embodiment, the user device 110 may fundamentally transmit a signal that is capable of indicating the location of a driver, and may additionally transmit a feedback signal associated with an error of determination of proximity to the management device 130. The vehicle device 120 contained in the vehicle may analyze a radio frequency (RF) signal transmitted by the user device 110, may recognize driver location information based on the result of analysis, and may perform control needed. As an additional function according to an embodiment, the vehicle device 120 may detect an error using driver location information which can be recognized by another route, may collect corresponding data, and may transmit the corresponding data to the management device 130. Accordingly, the management device 130 may perform machine learning based on the additional data, and may update mapping information. Particularly, the management device 130 may analyze a problem of determination of proximity, and may request and collect needed data. The management device 130 may improve a proximity determination function to a personalized proximity determination function. The management device 130 may update an existing machine learning model based on the data collected by the vehicle device 120, and may upgrade machine learning firmware of the corresponding vehicle.

Figure 2:
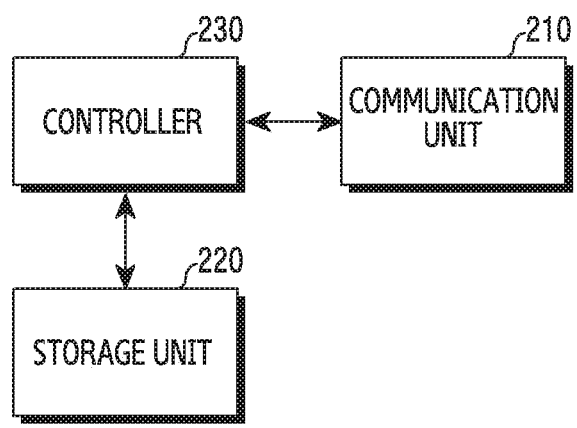
FIG. 2 is a diagram illustrating a configuration of a device included in a smart car system according to various embodiments of the disclosure.

FIG. 2 is a diagram illustrating a configuration of a device included in a smart car system according to various embodiments of the disclosure. The term "~unit" or "~er" used hereinafter may refer to the unit for processing at least one function or operation and may be implemented in hardware, software, or a combination of hardware and software. The configuration illustrated in FIG. 2 may be understood as one of the user device 110, the vehicle device 120, and the management device 130.

Referring to FIG. 2, the device may include a communication unit 210, a storage unit 220, and a controller 230.

The communication unit 210 may perform functions of transmitting or receiving a signal. For example, the communication unit 210 performs a function of conversion between a baseband signal and a bit stream according to a physical layer standard of the system. The communication unit 210 may perform a function for wired communication or wireless communication.

According to an embodiment, if the device of FIG. 2 is the user device 110 or the vehicle device 120, the communication unit 210 may include a hardware and protocol stack for wireless communication. For example, in the case of data transmission, the communication unit 210 generates complex symbols by encoding and modulating a transmission bit stream. Also, in the case of data reception, the communication unit 210 restores a reception bit stream by demodulating and decoding a baseband signal. Also, the communication unit 210 up-converts a baseband signal into a radio frequency (RF) band signal and transmits the same via an antenna, and down-converts an RF band signal received via an antenna into a baseband signal. For example, the communication unit 210 may include a transmission filter, a reception filter, an amplifier, a mixer, an oscillator, a digital-to-analog convertor (DAC), an analog-to-digital convertor (ADC), and the like.

Also, the communication unit 210 may include a plurality of communication modules for processing signals in one or more different frequency bands. In addition, the communication unit 210 may include a plurality of communication modules for supporting a plurality of different radio access technologies. For example, the different radio access technologies may include Bluetooth low energy (BLE), wireless fidelity (Wi-Fi), WiFi gigabyte (WiGig), a cellular network (e.g., long term evolution (LTE)), and the like. Further, the different frequency bands may include a super high frequency (SHF) (e.g., 2.5 GHz and 5 Ghz) band and a millimeter (mm) wave (e.g., 60 GHz) band.

The communication unit 210 may transmit or receive a signal as described above. Accordingly, a part or the whole of the communication unit 210 may be referred to as a transmitter, receiver, or transceiver, a modem, or the like. Also, the transmission and reception performed via a wireless channel, which is described in the following descriptions, may be understood as a meaning including the case in which the above-described processing is performed by the communication unit 210.

The storage unit 220 may store data, such as a basic program for operating a device, an application program, configuration information, and the like. The storage unit 220 may be configured as a volatile memory, a non-volatile memory, or a combination of a volatile memory and a non-volatile memory. According to an embodiment, if the device of FIG. 2 is the vehicle device 120 or the management device 130, the storage unit 220 may store mapping information used when the vehicle device 120 determines proximity. In addition, the storage unit 220 may provide data stored therein in response to a request from the controller 230.

The controller 230 may control overall operation of the device. For example, the controller 230 may transmit and receive signals via the communication unit 210. Further, the controller 230 records data in the storage unit 220 and reads the recorded data. To this end, the controller 230 may include at least one processor or micro-processor, or may be a part of the processor. If the device of FIG. 2 is the vehicle device 120, the controller 230 may determine the proximity of a driver based on data collected by the communication unit 210. Particularly, the controller 230 may perform control so that the device performs operations for optimization according to various embodiments described below. For example, the controller 230 may perform control so that the device performs a procedure according to various embodiments.

If the device of FIG. 2 is the user device 110, the device may further include a display unit for displaying a screen. For example, the display unit may include at least one of an organic light emitting diode (OLED), a Quantum-Dot light emitting diode (QLED), and a liquid crystal display (LCD).

If the device of FIG. 2 is the vehicle device 120, the device may further include a hardware element for communicating with other devices in the vehicle. For example, the device may further include an additional connector for wired cable connection.

If the device of FIG. 2 is the management device 130, the communication unit 210 may include a hardware element for wired communication. For example, the communication unit 210 may include at least one processor for signal processing and at least one connector for external cable connection.

Figure 3:
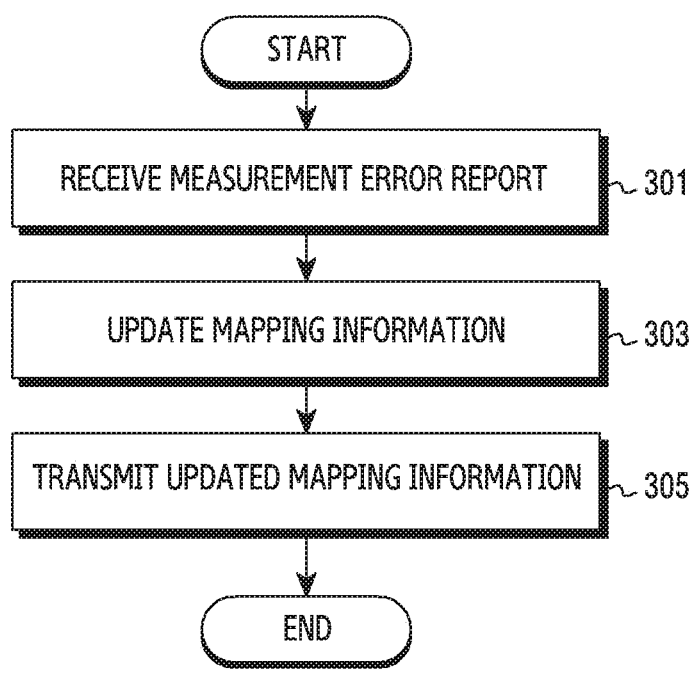
FIG. 3 is a diagram illustrating an operation method of a management device in a smart car system according to various embodiments of the disclosure.

FIG. 3 is a diagram illustrating an operation method of a management device in a smart car system according to various embodiments of the disclosure. FIG. 3 illustrates the operation method of the management device 130.

Referring to FIG. 3, in operation 301, the management device receives a report associated with an error in measurement. Here, the report associated with the error in the measurement may include at least one of an indicator (label) indicating that an error occurs, a point in time at which an error occurs, the content of determination which is identified as an error, and the determination of proximity obtained according to a scheme other than signal measurement. In this instance, the report associated with the error in the measurement may be received from a vehicle device (e.g., the vehicle device 120) or a user device (e.g., the user device 110). In this instance, if the report associated with the error in the measurement is received from the vehicle device, measurement data obtained when the error occurs may be received together. Conversely, if the report associated with the error in the measurement is received from the user device, the management device may transmit, to the vehicle device, a request for measurement data, and may receive the measurement data which is obtained when the error occurs. Here, the measurement data obtained when the error occurs may be referred to as "failure data" which is to be used for updating mapping information.

Subsequently, in operation 303, the management device updates mapping information. That is, the management device may update a machine learning model or mapping information via machine learning based on the received measurement data. The management device may manage mapping information that defines the correspondence relationship between measurement data and determination of proximity Mapping information may be identified based on a pair of the vehicle device and the user device. The determination of proximity is performed by the vehicle device according to mapping information managed by the management device. The management device may determine that existing mapping information is inappropriate based on the report associated with the error in the measurement, and may correct proximity information corresponding to the corresponding measurement data. In other words, the management device may update mapping information of the corresponding vehicle and the corresponding user.

Subsequently, in operation 305, the management device transmits the updated mapping information to the vehicle device. The management device transmits the updated mapping information to the vehicle device that causes the error, so that the updated mapping information is used when the vehicle device determines proximity.

As described in the embodiment with reference to FIG. 3, the management device may perform machine learning using measurement data provided from the vehicle device. In other words, the management device may add data collected for each person to an existing training data set that a manufacturer has, and may perform machine learning, thereby updating a proximity determination model. Also, the management device may update a machine learning model based on a training data set which has a property similar to the characteristics of data to be added. In other words, the management device adds a training data set which has a property similar to the characteristics of personalized data and information, to the existing training data set, and may perform machine learning, thereby updating a proximity determination model.

Figure 4:
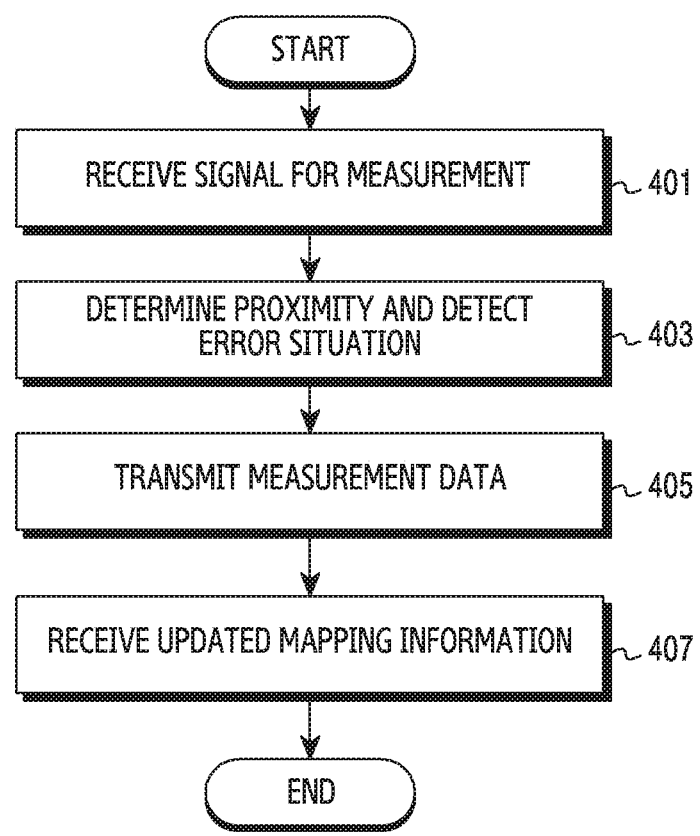
FIG. 4 is a diagram illustrating an operation method of a vehicle device in a smart car system according to various embodiments of the disclosure.

FIG. 4 is a diagram illustrating an operation method of a vehicle device in a smart car system according to various embodiments of the disclosure. FIG. 4 illustrates the operation method of the vehicle device 120.

Referring to FIG. 4, in operation 401, a vehicle device receives a signal for measurement, which is transmitted from a user device (e.g., the user device 110). Accordingly, the vehicle device measures a signal via at least one antenna, and generates measurement data. The vehicle device may determine proximity using the measurement data and predetermined mapping information. That is, the vehicle device may determine proximity according to a machine learning scheme using measurement data, for example, whether the user device is located inside the vehicle, whether the user device is near the vehicle, or whether the user device is far from the vehicle.

Accordingly, in operation 403, the vehicle device determines proximity, and detects an error situation. In this instance, the error situation may be detected based on determination by the vehicle device, or may be detected via a notification from a management device. If the error situation is detected based on the determination by the vehicle device, the vehicle device compares the result of determination based on the measurement data with the result of determination based on other information. If the compared results of determination are not identical, the vehicle device may determine that it is an error situation. Accordingly, the vehicle device may collect measurement data associated with the error situation. For example, the result of determination based on other information may be generated based on at least one of a vehicle control situation, a sensing result obtained by at least one sensor installed in the vehicle, and a user input. For example, although vehicle control or contact sensing apparently shows that a driver is inside the vehicle, if it is determined that the driver is outside the vehicle since the location of the user device is not identified from a predetermined location, the vehicle device may collect measurement data. Alternatively, if the driver approaches the vehicle to open a door, and fails to open the door since it is determined that the driver is far from the vehicle, the vehicle device may collect measurement data. Alternatively, if the driver corrects the determination by moving the location of the user device since the driver fails to operate a device or fails to open the door, the vehicle device may collect measurement data associated with when failure occurs. In addition, in the case of a scheme other than the automatic determination scheme using a signal, for example, if the driver directly requests data measurement, the vehicle device may collect measurement data.

Subsequently, in operation 405, the vehicle device transmits measurement data to the management device (e.g., the management device 130). That is, the vehicle device transmits measurement data collected as the error situation is detected. In this instance, the vehicle device may transmit the measurement data in response to a request from the management device, or may transmit the measurement data since the determinations of proximity obtained according to different schemes are different from each other. If the determinations of proximity are different from each other, the vehicle device may further transmit a report associated with an error in the measurement. Here, the report associated with an error in the measurement may include at least one of an indicator (label) indicating that an error occurs, a point in time at which an error occurs, the content of determination which is identified as an error, and the determination of proximity obtained according to a scheme other than signal measurement.

Subsequently, in operation 407, the vehicle device receives updated mapping information. The updated mapping information includes proximity information corrected based on the measurement data transmitted in operation 405. Accordingly, the vehicle device updates stored mapping information, and may use the same for determining proximity later.

As shown in the embodiment described with reference to FIG. 4, the vehicle device collects additional data for location measurement learning when an error occurs in the determination of proximity, and may transmit the collected data/information/content of determination to the management device. That is, the vehicle device may transmit personalized data or information to the management device that updates a model via machine learning. In this instance, according to various embodiments, the vehicle device may count the collected personalized data or processed information in real time or during a predetermined period of time, and may transmit the same to the management device in the short term or periodically.

Figure 5:
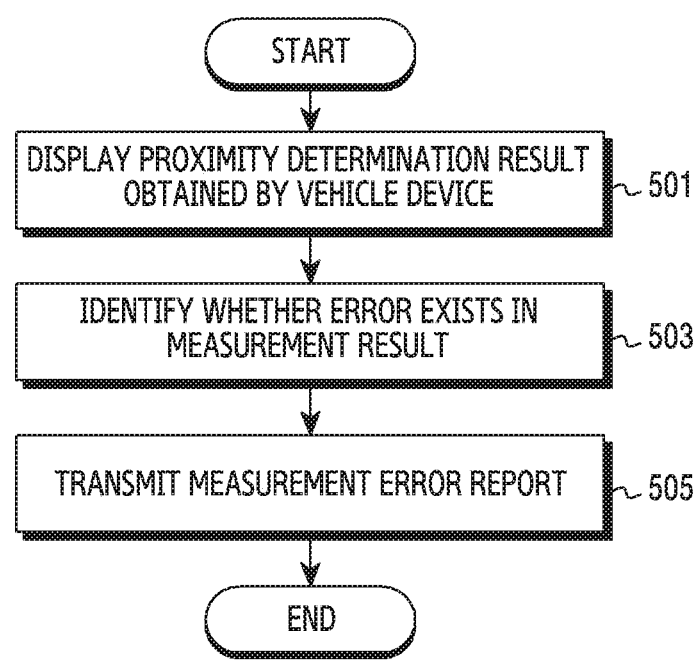
FIG. 5 is a diagram illustrating an operation method of a user device in a smart car system according to various embodiments of the disclosure.

FIG. 5 is a diagram illustrating an operation method of a user device in a smart car system according to various embodiments of the disclosure. FIG. 5 illustrates the operation method of the user device 110.

Referring to FIG. 5, in operation 501, a user device displays a proximity determination result obtained by a vehicle device (e.g., the vehicle device 120). Prior to this, the user device may receive, from a management device (e.g., the management device 130), a message informing of the proximity determination result obtained by the vehicle device. Here, an interface for displaying the proximity determination result may include at least one from among at least one object (e.g., a notification window) for indicating the result of determination, at least one object (e.g., a button) for inputting an error report command, and at least one object (e.g., a button or a check box) for inputting the determination of proximity determined by a user.

Subsequently, in operation 503, the user device identifies whether an error exists in the result of determination. For example, the user device may identify an error report command from the user. The error report command is detected via the interface displayed in operation 501. For example, if a driver who is far from the vehicle recognizes that the determination by the vehicle devices is "near" which is incorrect, the user may command to report an error using an input means (e.g., a touch screen).

Subsequently, in operation 505, the user device transmits a report associated with the error in the measurement to the management device. Here, the report associated with the error in the measurement may include at least one of an indicator indicating that an error occurs, information indicating a point in time at which an error occurs, the content of determination which is identified as an error, and the determination of proximity determined according to a scheme (user's selection) other than signal measurement.

As shown in the embodiment described with reference to FIG. 5, the user device may transmit an error report based on the determination by the user. That is, while the driver attempts to open or close the door of the vehicle accustomedly, the deriver recognizes an error in the determination of proximity made by the vehicle device, and may feedback the error of the determination made by the vehicle device at a predetermined location/operation to the management device using the user device.

Figure 6:
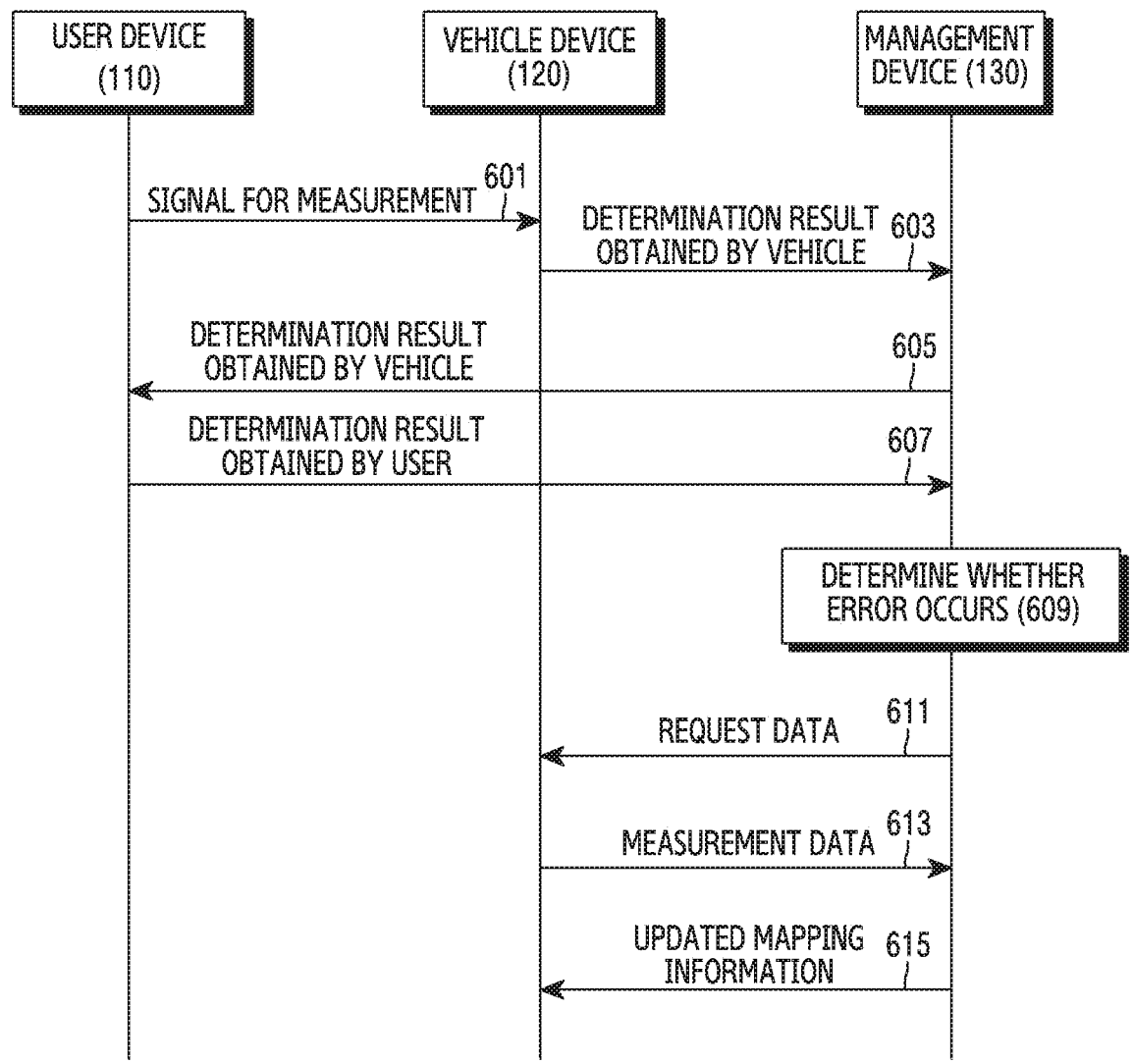
FIG. 6 is a diagram illustrating signal exchange for optimization based on determination by a user in a smart car system according to various embodiments.

FIG. 6 is a diagram illustrating signal exchange for optimization based on determination by a user in a smart car system according to various embodiments. FIG. 6 illustrates signal exchange among the user device 110, the vehicle device 120, and the management device 130.

Referring to FIG. 6, in operation 601, the user device 110 transmits a signal for measurement. Accordingly, the vehicle device 120 performs measurement associated with a signal received via at least one antenna, and determines the proximity of the user device 110. Here, the signal for measurement may include a Bluetooth low energy (BLE) signal, a wireless LAN signal, and a signal of other radio access technologies (RAT). The signal for measurement may include predetermined data or sequence, and may be a single signal or a combination of two or more signals.

In operation 603, the vehicle device 120 transmits a proximity determination result to the management device 130. The proximity determination result may indicate one of an "inside" state, a "near" state, and a "far" state.

In operation 605, the management device 130 transmits, to the user device 110, the proximity determination result obtained from the vehicle device 120. That is, the management device 130 may transmit the proximity determination result obtained by the vehicle device 120 to the user device 110, so that a user can evaluate the proximity determination result obtained from the vehicle device 120. Accordingly, the user may identify whether the proximity determination result obtained by the vehicle device 120 is identical to the actual situation, and may evaluate whether an error occurs.

In operation 607, the user device 110 transmits a proximity determination result obtained by the user to the management device 130. According to an embodiment, the proximity determination result may be transmitted if the proximity determination result obtained from the vehicle device 120 is different from the actual situation. In this instance, the proximity determination result obtained by the user may be transmitted as a part of an error report. The error report may include at least one of an indicator indicating that an error occurs, information indicating a point in time at which an error occurs, the content of determination which is identified as an error, and the determination of proximity determined by the user. According to another embodiment, the proximity determination result may be transmitted, irrespective of whether the proximity determination result obtained from the vehicle device 120 is different from the actual situation.

In operation 609, the management device 130 determines an error of the determination of proximity According to an embodiment, receiving the proximity determination result from the user device 110 may indicate an error. In this instance, the management device 130 may determine whether an error occurs based on whether the proximity determination result is received from the user device 110. According to another embodiment, the management device 130 may determine whether an error occurs based on whether the proximity determination result received in operation 603 is identical to the proximity determination result received in operation 607. In the present embodiment, it is assumed that an error occurs.

In operation 611, the management device 130 requests measurement data from the vehicle device 120. In other words, the management device 130 transmits a message for requesting measurement data associated with an error situation, that is, a message for requesting failure data. In this instance, the message may include at least one of an indicator indicating a request for measurement data, information indicating a point in time at which an error occurs, and the content of determination which is identified as an error.

In operation 613, the vehicle device 120 transmits measurement data to the management device 130. The measurement data may include at least one measurement value used for determining the result of determination transferred in operation 603. For example, the measurement data may include at least one from among a received signal strength indicator (RSSI) for each antenna, the direction of a received signal, and RAT-related information.

In operation 615, the management device 130 transmits updated mapping information to the vehicle device 120. That is, the management device 130 may correct proximity information corresponding to the measurement data, and may transmit the mapping information updated based on corresponding failure data. For example, the management device 130 corrects the proximity information using the result of determination by the user, which is received in operation 607, and may update a machine learning model using the corresponding data. In this instance, the entirety of the mapping information may be transmitted or a part of the mapping information which includes only a corrected part may be transmitted.

Figure 7:
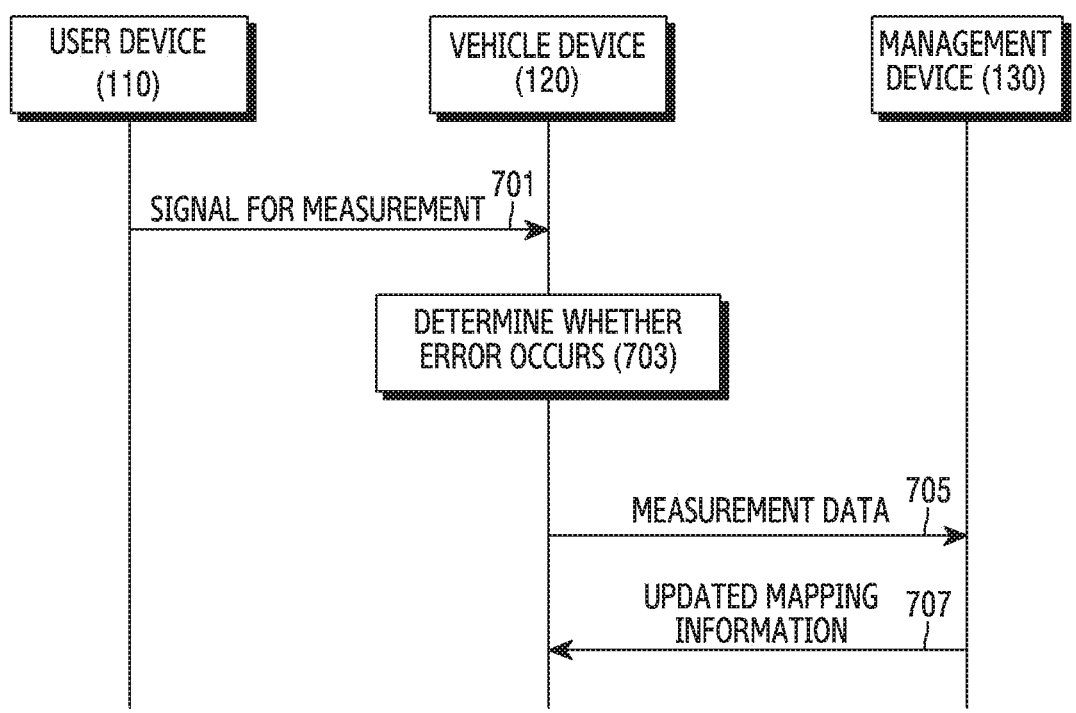
FIG. 7 is a diagram illustrating signal exchange for optimization based on determination by a vehicle device in a smart car system according to various embodiments.

FIG. 7 is a diagram illustrating signal exchange for optimization based on determination by a vehicle device in a smart car system according to various embodiments. FIG. 7 illustrates signal exchange among the user device 110, the vehicle device 120, and the management device 130.

Referring to FIG. 7, in operation 701, the user device 110 transmits a signal for measurement. Accordingly, the vehicle device 120 performs measurement associated with a signal received via at least one antenna, and determines the proximity of the user device 110. Here, the signal for measurement may include a Bluetooth low energy (BLE) signal, a wireless LAN signal, and a signal of other radio access technologies (RAT). A signal for measurement may include predetermined data or sequence, and may be a single signal or a combination of two or more signals.

In operation 703, the vehicle device 120 determines an error in a proximity determination result. That is, the vehicle device 120 generates the proximity determination result based on the measurement of the signal received in operation 701. The vehicle device 120 may determine whether an error occurs depending on whether a proximity determination result obtained according to another scheme is identical to the proximity determination result based on measurement. In the present embodiment, it is assumed that an error occurs.

In operation 705, the vehicle device 120 transmits measurement data to the management device 130. The measurement data includes at least one measurement value associated with the signal received in operation 701. For example, the measurement data may include at least one from among a received signal strength indicator (RSSI) for each antenna, the direction of a received signal, and RAT-related information. In this instance, according to an embodiment, a report associated with an error in measurement may be further transmitted together with the measurement data. Here, the report associated with the error in the measurement may include at least one of an indicator indicating that an error occurs, a point in time at which an error occurs, the content of determination which is identified as an error, and the determination of proximity obtained according to a scheme other than signal measurement.

In operation 707, the management device 130 transmits updated mapping information to the vehicle device 120. That is, the management device 130 may correct proximity information corresponding to the measurement data, and may transmit mapping information including the corrected proximity information. For example, the management device 130 may correct the proximity information using the user's determination result received in operation 607. In this instance, the entirety of the mapping information may be transmitted or a part of the mapping information which includes only a corrected part may be transmitted.

According to various embodiments, the performance of determination of proximity may be optimized. Throughout the above-described embodiments, a procedure of updating mapping information when an error is detected has been described. Hereinafter, as a detailed example, the disclosure describes an optimized procedure in the situation in which a proximity determination result and the actual state are specified.

Figure 8:
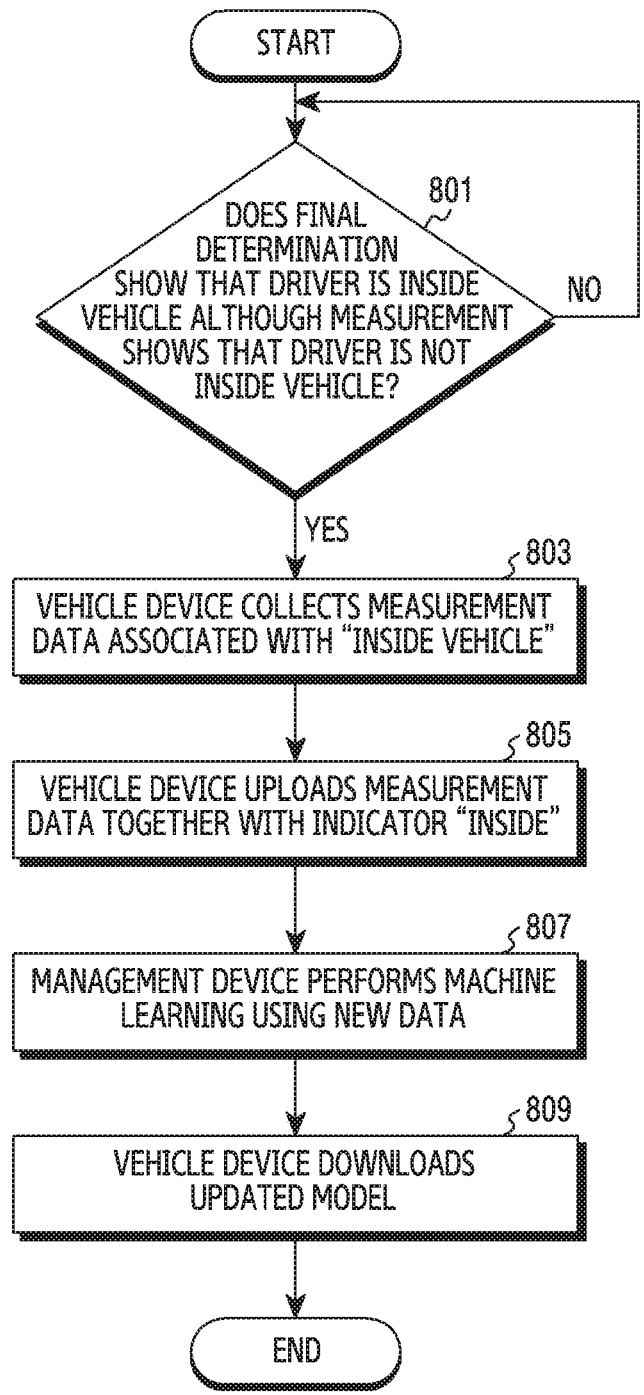
FIG. 8 is a diagram illustrating an operation method for optimally distinguishing an "inside" state and a "near" state associated with a vehicle in a smart car system.

FIG. 8 is a diagram illustrating an operation method for optimally distinguishing an "inside" state and a "near" state associated with a vehicle in a smart car system. FIG. 8 illustrates the case in which an error is detected based on the determination by a vehicle device.

Referring to FIG. 8, in operation 801, the vehicle device determines that a driver is not located inside the vehicle, based on measurement data, and identifies whether a device operation or a driver's feedback which is contradictory to the determination occurs. In other words, although the vehicle device measures that the driver is located outside the vehicle, the vehicle device determines whether the driver is located inside the vehicle as the final determination. That is, although determination by machine learning based on a signal from a user device is "near" or "far", the vehicle device may determine that a user is located inside the vehicle, based on other information. For example, if the user device docks at a connector installed inside the vehicle, it is determined that the user device is located inside the vehicle. As another example, if a driver is in contact with a driver's seat, or weight is detected, or the ignition of the vehicle is turned on, it is determined that the driver is inside the vehicle.

Although it is determined that the driver is not located inside the vehicle, based on measurement data, if a device operation or a driver's feedback which is contradictory to the determination occurs, the vehicle device collects measurement data associated with "inside the vehicle" in operation 803. That is, the vehicle device collects measurement data corresponding to an "inside" state. In this instance, the vehicle device may generate new measurement data or may identify previously generated measurement data. Subsequently, in operation 805, the vehicle device uploads measurement data together with an indicator indicating "inside". The indicator is referred to as "label". That is, the vehicle device transmits measurement data and information indicating the final determination to the management device.

Subsequently, in operation 807, the management device performs machine learning using new data. That is, the management device may correct a machine learning model, based on the indicator and measurement data uploaded in operation 805. Accordingly, mapping information for determining proximity may be updated. In operation 809, the vehicle device downloads the updated mapping information. That is, the vehicle device receives the updated machine learning model from the management device. Accordingly, the vehicle device optimizes a proximity determination function.

Figure 9:
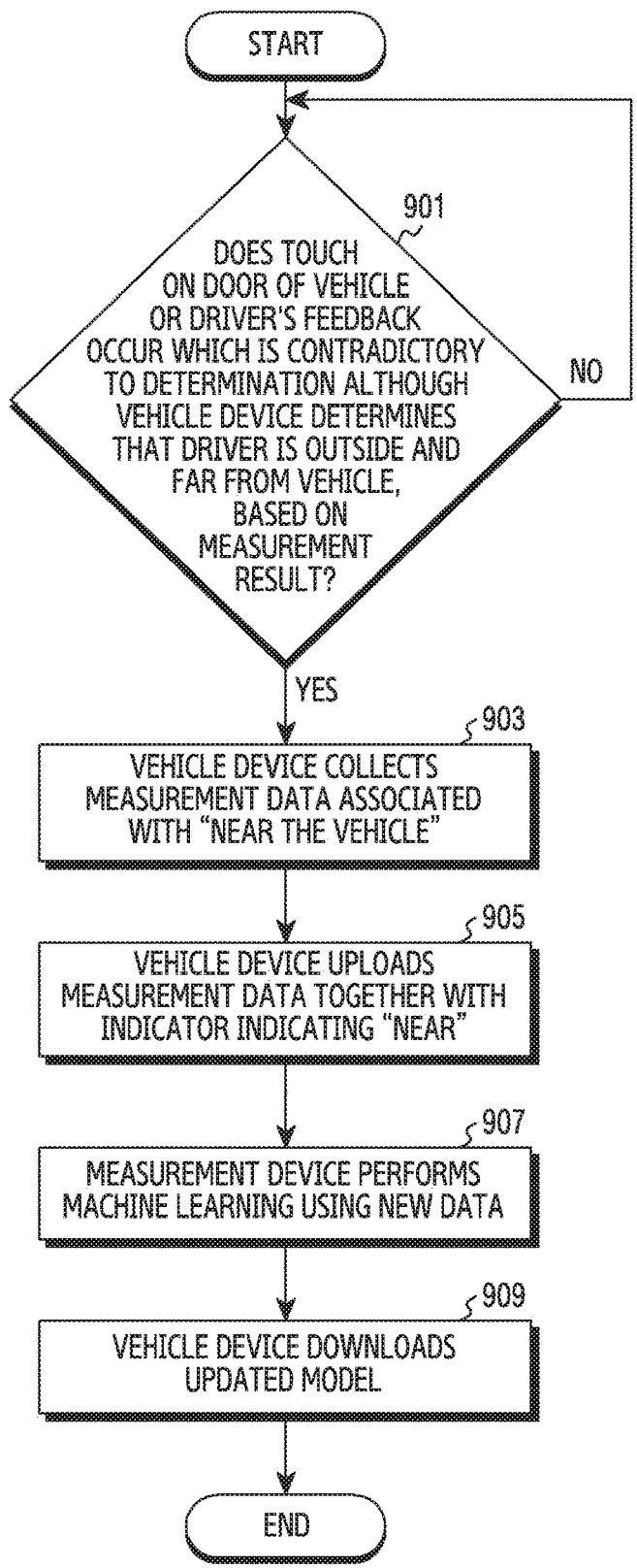
FIG. 9 is a diagram illustrating another operation method for optimally distinguishing an "inside" state and a "near" state associated with a vehicle in a smart car system.

FIG. 9 is a diagram illustrating another operation method for optimally distinguishing an "inside" state and a "near" state associated with a vehicle in a smart car system.

Referring to FIG. 9, in operation 901, although a vehicle device determines an "outside" and "far" state, based on a measurement result, the vehicle device determines whether a touch on the door of the vehicle or a driver's feedback which is contradictory to the determination occurs. In other words, the vehicle device obtains a measurement indicating that the driver is not located inside the vehicle, and determines whether a touch on the door of the vehicle occurs. The touch on the door of the vehicle may be detected by at least one sensor, or may be detected by operating the door (e.g., opening the door).

Although it is determined that the driver is located outside and far from the vehicle, based on the measurement result, if a touch on the door of the vehicle or a driver's feedback which is contradictory to the determination occurs, the vehicle device may collect measurement data associated with "near the vehicle" in operation 903. That is, the vehicle device collects measurement data corresponding to the "near" state. In this instance, the vehicle device may generate new measurement data or may collect previously generated measurement data. Subsequently, in operation 905, the vehicle device uploads measurement data together with an indicator indicating "near" to the management device. That is, the vehicle device transmits measurement data and information indicating the final determination to the management device.

Subsequently, in operation 907, the management device performs machine learning using new data. That is, the management device may correct a machine learning model, based on the indicator and measurement data uploaded in operation 905. Accordingly, mapping information for determining proximity may be updated. In operation 909, the vehicle device downloads the updated mapping information. That is, the vehicle device receives the updated machine learning model from the management device. Accordingly, the vehicle device optimizes a proximity determination function.

Figure 10:
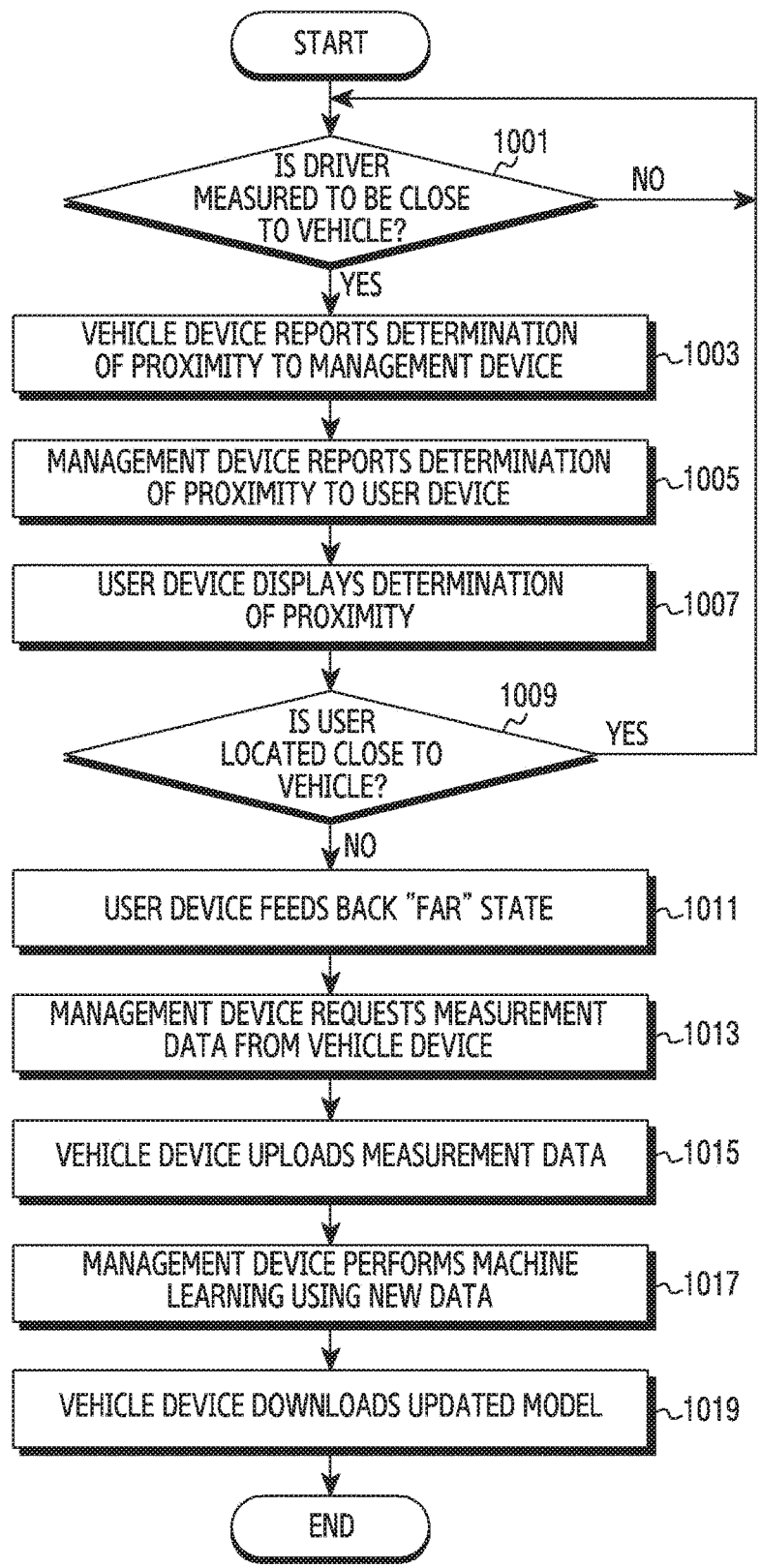
FIG. 10 is a diagram illustrating an operation method for optimally distinguishing a "near" state and a "far" state associated with a vehicle in a smart car system.

FIG. 10 is a diagram illustrating an operation method for optimally distinguishing a "near" state and a "far" state associated with a vehicle in a smart car system according to various embodiments of the disclosure. FIG. 10 illustrates the case in which an error is detected based on the determination by a user.

Referring to FIG. 10, in operation 1001, a vehicle device may identify whether a driver is close to a vehicle. For example, the vehicle device may identify whether the driver is close to the vehicle via determination by machine learning based on a signal from a user device. If it is estimated that the driver is close to the vehicle, the vehicle device reports the determination of proximity to a management device in operation 1003. Subsequently, in operation 1005, the management device reports the determination of proximity to the user device. In operation 1007, the user device displays the determination of proximity. That is, the user device outputs a determination result obtained by the vehicle device to an output means (e.g., a display), so as to report the same to the user.

In operation 1009, the user device determines whether the user is close to the vehicle. For example, the user device may determine whether the user is close to the vehicle, based on a user input. If the user is close to the vehicle, the method proceeds with operation 901 without changing a mapping model. If the user is not close to the vehicle, the user device feeds back that the user is in the "far" state in operation 1011. That is, the user device reports, to the management device, that an error exists in determination by the vehicle device. In operation 1013, the management device requests failure data from the vehicle device. Accordingly, in operation 1015, the vehicle device uploads the failure data.

Subsequently, in operation 1017, the management device performs machine learning using new data. That is, the management device may correct a machine learning model, based on the information corrected in operation 1011 and information collected in operation 1015. Accordingly, mapping information for determining proximity may be updated. In operation 919, the vehicle device may optimize a proximity determination function by downloading the updated model.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method for operating a vehicle device in a smart car system, the method comprising:
   receiving at least one signal transmitted from a user device;
   transmitting, to a management device, measurement data associated with the at least one signal;
   generating, based on the measurement data, a first proximity determination result associated with the user device;
   generating, based on information other than the measurement data, a second proximity determination result associated with the user device;
   transmitting the measurement data to the management device, in case that the first proximity determination result and the second proximity determination result are different; and
   receiving, from the management device, updated mapping information that is based on the measurement data and proximity information of the first proximity determination result.

2. The method of claim 1, further comprising:
   transmitting the first proximity determination result to the management device; and
   receiving a request for the measurement data from the management device.

3. The method of claim 1, wherein the second proximity determination result is determined based on at least one of a vehicle control situation, a sensing result obtained by at least one sensor installed in a vehicle, and a user input.

4. A method for operating a management device in a smart car system, the method comprising:
   receiving, from a vehicle device, measurement data associated with at least one signal transmitted from a user device;
   receiving a first proximity determination result generated by the vehicle device, based on the measurement data;
   transmitting the first proximity determination result to the user device;
   receiving an error report including a second proximity determination result generated by the user device, based on information other than the measurement data;
   receiving the measurement data from the vehicle device, in case that the first proximity determination result and the second proximity determination result are different; and
   updating, based on the measurement data, mapping information associated with the measurement data and proximity information of the first proximity determination result; and
   transmitting, to the vehicle device, the updated mapping information.

5. The method of claim 4, further comprising:
   detecting that an error occurs in determination of proximity by receiving the measurement data.

6. The method of claim 4, further comprising:
   detecting that an error occurs in determination of proximity by receiving the error report.

7. The method of claim 5, further comprising:
   transmitting, to the vehicle device, a request for the measurement data related to the error in the determination of proximity.

8. A method for operating a user device in a smart car system, the method comprising: transmitting a signal for measurement to a management device; receiving, from the management device, a first proximity determination result generated by a vehicle device, based on measurement data; displaying the first proximity determination result, the displaying of the first proximity determination result including at least one of at least one object for indicating a result of determination, at least one object for inputting an error report command, or at least one object for inputting a determination of proximity determined by a user; and transmitting, to the management device, an error report including a second proximity determination result selected by user made by the vehicle device.

9. The method of 12, wherein the error report comprises at least one of an indicator indicating occurrence of an error, information indicating a point in time at which an error occurs, and a content of determination which is identified as an error.

* * * * *